June 5, 1962 G. D. WOFFORD 3,038,127
PROTECTION CIRCUIT FOR TRANSISTORIZED POWER CONVERTER
Filed April 21, 1959
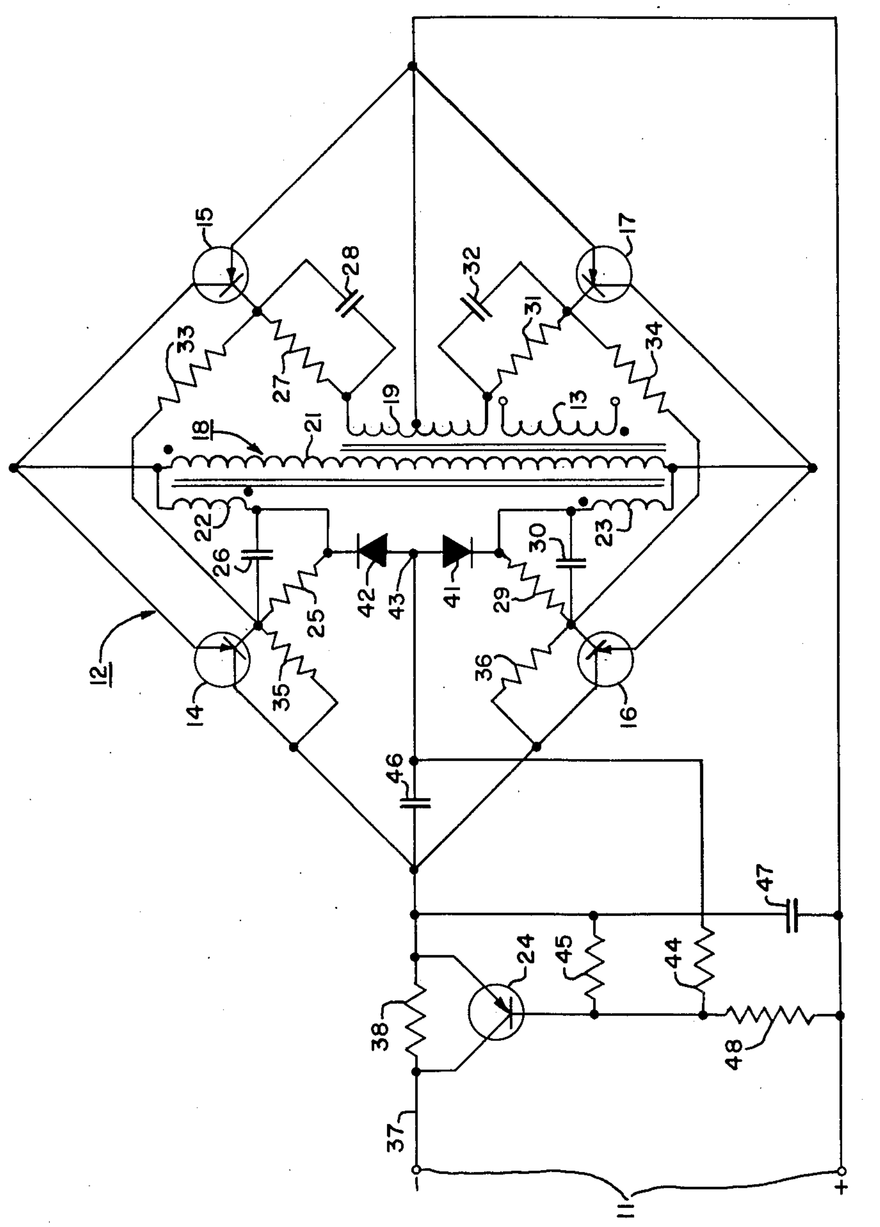
INVENTOR
GEORGE D. WOFFORD
BY *Robert T. Killman*
ATTORNEY United States Patent Office 3,038,127

Patented June 5, 1962

3,038,127

PROTECTION CIRCUIT FOR TRANSISTORIZED POWER CONVERTER

George D. Wofford, Baltimore County, Md., assignor to The Bendix Corporation, a corporation of Delaware Filed Apr. 21, 1959, Ser. No. 807,914
2 Claims. (Cl. 331—62)

This invention relates generally to direct current converter type power supplies in which a transistor oscillator is employed. More particularly the invention relates to transistor oscillators in which a substantial amount of power in the form of alternating current is supplied to an output winding of a transformer and the alternating current power is derived from a source of direct current by means of a transistor oscillator circuit suitably connected between the direct current source and the transformer.

Transistor converter circuits are well known for producing alternating current power from a source of direct current. Devices of this type generally utilize a transformer core having a rectangular hysteresis loop characteristic in conjunction with the current amplification characteristics of one or more transistors to generate oscillations in the transformer winding which can be supplied to an output load device by coupling an output winding to the core of the transformer. A common application of circuits of this type further includes the rectification of the output alternating current for the purpose of supplying direct current to the ultimate load at a different voltage level than that available from the original direct current source. When an oscillator is employed in power supply service in which the rectified output from the oscillator transformer supplies various electronic load devices it is not unusual for a short circuit or other heavy current drain to occur in the output circuit of the transformer.

The low impedance represented by such high current drains is reflected by the transformer into the oscillatory transistor circuit with the general result that oscillations are no longer sustained. Under this condition the transistors operate in a quiescent condition with a steady current flow therethrough determined by the parameters of the circuit.

It has been found in transistor converter type power supplies that the damping introduced by a short circuit in the ouput of the device resulting in cessation of oscillations is detrimental to the oscillator transistors to the extent that they are destroyed by momentary overloads lasting only the order of a few milliseconds. The burnout of these transistors is a result of a steady current which is less than the normal current flow to the input to the oscillator from the supply source and thus protection of the transistors by normal input current overload devices or current sensing circuit is not feasible.

The primary object of the present invention is to provide a circuit for protecting transistors in oscillatory circuits from damage resulting from a momentary cessation of oscillations.

A further object of this invention is to provide a protective circuit which permits a transistor oscillator to resume normal oscillatory operation upon the termination of a fault which would be destructive of the transistors in an unprotected oscillator circuit.

A further object of the invention is to provide a detector circuit for operating a protective means in order that the protective means can be rendered operative to protect the oscillator circuit upon the detection of termination of oscillations.

A still further object is to provide a simple and reliable transistor oscillator protective circuit which is economical to manufacture and uses a minimum of additional components.

These and other objects of the invention will become apparent from the following detailed description taken in conjunction with the accompanying drawing in which the single FIGURE shows a protected oscillator circuit employing transistors in accordance with the present invention.

The present invention operates by detecting each half cycle of oscillation in a transistor oscillator circuit and maintaining the bias on a protective device in response to the detected oscillations. The disappearance of detected oscillations will render the protective device active to reduce the current supply to the oscillator circuit to a safe level but which will be sufficient to permit oscillations to resume upon termination of the fault.

Referring to the drawing, a preferred embodiment of the invention is disclosed having a pair of input terminals 11 to which is connected a direct current source. Energy from the source connected to the terminals 11 is inverted by the oscillator circuit generally indicated as 12 to produce a useful alternating current output power at an output winding 13.

The oscillator 12 comprises bridge connected transistors 14, 15, 16, 17 and a saturable core transformer generally designated 18. The transformer 18 has a center tapped input winding 19, an oscillatory winding 21, and feedback windings 22, 23 as well as one or more output windings 13. The bridge is made up of the four transistor arms having the transformer winding 21 across one diagonal and the direct current source connected to terminals 11 connected across the other diagonal of the bridge through a protective circuit including a transistor 24 which will be described in detail hereinafter. The transistors 14, 15, 16, 17 are each connected to their respective feedback windings through a shunt combination of resistance and capacitance. Transistor 14 has its base connected through resistor 25 and capacitor 26 to winding 22. Transistor 15 has its base connected through resistor 27 and capacitor 28 to one end of the winding 19. Transistor 16 has its base connected through a resistor 29 and capacitor 30 to winding 23. Transistor 17 has its base connected through a resistor 31 and capacitor 32 to the remaining end of winding 19. The bases of transistors 14, 15 are connected by a resistor 33 and the bases of transistors 16, 17 are connected by a resistor 34. Transistors 14, 16 have resistors 35, 36 respectively connected between the base and collector electrodes thereof. The connections thus far described provide a square wave oscillator with the transistors 14, 15, 16, 17 appropriately biased to initiate oscillations upon application from terminals 11 of direct current power to the diagonal of the bridge as shown.

The protective circuit of the oscillator comprises transistor 24 which is connected in supply lead 37 to supply the input current to the oscillator 12 through the collector-emitter path in the transistor 24. Connected across the collector and emitter of transistor 24 is a resistor 38. With this arrangement for transistor 24 in the conducting condition, direct current is supplied to the bridge through the collector-emitter path of transistor 24. For transistor 24 in the non-conducting condition the resistor 38 is in series with the supply lead 37 which supplies direct current to the bridge.

The transistor 24 is dynamically biased in conducting condition during oscillation of the bridge 12. This dynamic bias is derived from the feedback windings 22, 23 by means of a pair of diodes 41, 42. Like electrodes of the diodes 41, 42 are joined at a common point 43 which is connected by resistor 44 to the base of transistor 24. The base and emitter of transistor 24 are connected by resistor 45. A pair of capacitors 46, 47 may be connected as shown to filter the bias signal applied to the base of transistor 24 and to reduce the dissipation in transistor 24 by reducing the voltage drop across the transistor. A resistor 48 is connected from the positive terminal 11 to the base of transistor 24.

The operation of the circuit of the invention is initiated by the application of direct current power to the terminals 11 with the polarities indicated. Prior to the beginning of oscillation in the bridge oscillator 12 current will be cut off in the transistor 24 but will be conducted to the bridge through the resistor 38 and the positive lead from the terminal 11. The resistor 38 permits sufficient power to be applied across the bridge to permit oscillation to build up in the oscillator 12. The oscillatory operation of such circuits is considered to be well known and will not be described in detail herein. In general, the slight unbalance which is inevitable in such circuits results in a greater current flowing through one pair of transistors such as transistors 14, 17 than flows through the opposite pair 15, 16. This current produces regenerative voltage induced in the transformer 18 to further increase the current in the conducting pair of transistors 14, 17 and further bias to cut off the opposite pair of transistors 15, 16. The regenerative process completes the current buildup to a maximum in a short period of time at which time the core of transformer 18 saturates. With no changing flux, induction ceases and current flow in the feedback windings commences to reverse thereby inducing voltages which tend to cut off the conducting transistors 14, 17. Simultaneously the non-conducting transistors 15, 16 are switched into conduction until the opposite conductive conditions occur and the transformer core saturates in the opposite direction. The resulting action produces a well known oscillatory condition wherein the bridge oscillator 12 oscillates at the frequency determined by the circuit parameters and may be, for example, in the neighborhood of 1500 cycles per second.

When transistors 14 and 17 are conducting, the feedback winding 22 has a voltage induced therein such that a negative potential exists at the junction of resistor 25 and diode 42 with respect to the voltage at the junction of resistors 38, 45. This voltage causes diode 42 to conduct and current flows through resistors 44, 45 to produce a negative bias at the base of transistor 24. This negative bias at the base of transistor 24 causes it to conduct heavily between collector and emitter electrodes to supply full power to the bridge circuit 12. At the same time, the voltage induced in the feedback winding 23 is positive, such that the diode 41 does not conduct and the bias to the base of transistor 24 is determined by the conduction in the diode 42. For the next half-cycle of oscillation the polarities of the voltages on the feedback windings will be reversed and the diode 41 will conduct to produce a current flow in the same direction through resistors 44, 45 and maintain the base of transistor 24 negative to maintain the transistor 24 in a heavily conductive condition. The feedback for this half-cycle to the diode 42 is positive in polarity and thus diode 42 does not conduct. As a result of this arrangement the bridge circuit 12 rapidly builds up to full oscillation with full power supplied thereto through the heavily conducting transistor 24 which is alternately biased by the diodes 41, 42 for each half-cycle of oscillation, such that the transistor 24 remains substantially continuously conductive. Upon the occurrence of a short circuit or overload in the output circuit connected to the winding 13, however, the oscillator 12, in the absence of the circuit associated with transistor 24, will cease oscillation and the bias on the transistors 14, 15, 16, 17 is such that a steady current will flow in both branches of the bridge circuit. This steady current is actually less than the normal current flow through the primary circuit when the oscillator is oscillating and therefore normal short circuit protective devices do not cause protective action to be initiated. This steady current flow through the power transistors would result in increased power dissipation therein, and burn out of the power transistors would occur in a matter of a few milliseconds from the time the short circuit occurs. With the present circuit operative, however, the cessation of oscillations in the oscillator 12 immediately removes the negative bias from the base of transistor 24 and permits the positive bias resulting from resistors 45, 48 to cut off the transistor 24. With transistor 24 cut off the resistor 38 dissipates a sufficient amount of power to protect the power transistors 14, 15, 16, 17 from damage due to high current and excessive power dissipation while at the same time supplying sufficient energy to the bridge circuit 12 to permit oscillation to be resumed once the short circuit across the winding 13 is removed.

While a particular embodiment of the invention has been disclosed, it is to be understood that the disclosed embodiment is illustrative only and the invention is not limited to the particular circuit shown. Many other circuits will be apparent in the light of the present disclosure to those skilled in the art to utilize the advantages of the present invention and are to be understool as being within the scope of the invention as defined in the appended claims.

While not necessarily limited thereto, the values of resistors and capacitors found suitable for a particular embodiment of the present circuit are given below:

| | | Ohms |
|---|---|---|
| Resistors **25**, **27**, **29**, **31** | | 47 |
| Resistors **33**, **34** | | 4.7 |
| Resistors **35**, **36** | | 2200 |
| Resistor **38** | | 80 |
| Resistor **44** | | 50 |
| Resistor **45** | | 100 |
| Resistor **48** | | 1000 |
| Capacitors **26**, **28**, **30**, **32** | μf | 0.25 |
| Capacitor **46** | μf | .05 |
| Capacitor **47** | μμf | 50 |

I claim:

1. A semiconductor converter circuit comprising a saturable core transformer, a plurality of semiconductor devices connected to said transformer, said semiconductor devices and said transformer forming a regenerative circuit for producing sustained oscillations, a load circuit coupled to said transformer, a source of direct current, a parallel circuit composed of a resistor in parallel with a controlled current conducting device, a circuit for supplying direct current from said source to said regenerative circuit through said parallel circuit, means for detecting said oscillations for obtaining a control bias from said oscillations and a control circuit for making said controlled current conducting device conductive only in response to said control bias.

2. A transistor converter circuit comprising a source of direct current, a first transistor, a resistor connected between the collector and emitter electrodes of said first transistor, a saturable core transformer, two pairs of transistors connected in a bridge circuit with a winding of said transformer across one diagonal of said bridge, means coupled to said transformer for regeneratively driving said pairs of transistors alternately into conduction and cut-off to maintain oscillations in said transformer, a load circuit coupled to said transformer and capable of overload conditions sufficient to terminate said oscillations, a circuit connecting said source to the other diagonal of said bridge through said resistor and the collector-emitter path of said first transistor, a pair of detectors connected to detect alternate half-cycles of said oscillations, a circuit connected to bias said first transistor for full conduction in response to each detected half-cycle, and a circuit for biasing said first transistor to cut-off in the absence of said detected half-cycles.

References Cited in the file of this patent

UNITED STATES PATENTS

| | | |
|---|---|---|
| 2,129,088 | George | Sept. 6, 1938 |
| 2,546,500 | Hall | Mar. 27, 1951 |
| 2,820,900 | Scal | Jan. 21, 1958 |
| 2,832,900 | Ford | Apr. 29, 1958 |
| 2,872,582 | Norton | Feb. 3, 1959 |
| 2,874,293 | McMurren | Feb. 17, 1959 |